T. B. CROWE.
PROCESS AND APPARATUS FOR PRECIPITATING MATERIALS FROM SOLUTION.
APPLICATION FILED MAR. 17, 1917.
1,321,985.
Patented Nov. 18, 1919.
2 SHEETS—SHEET 2.
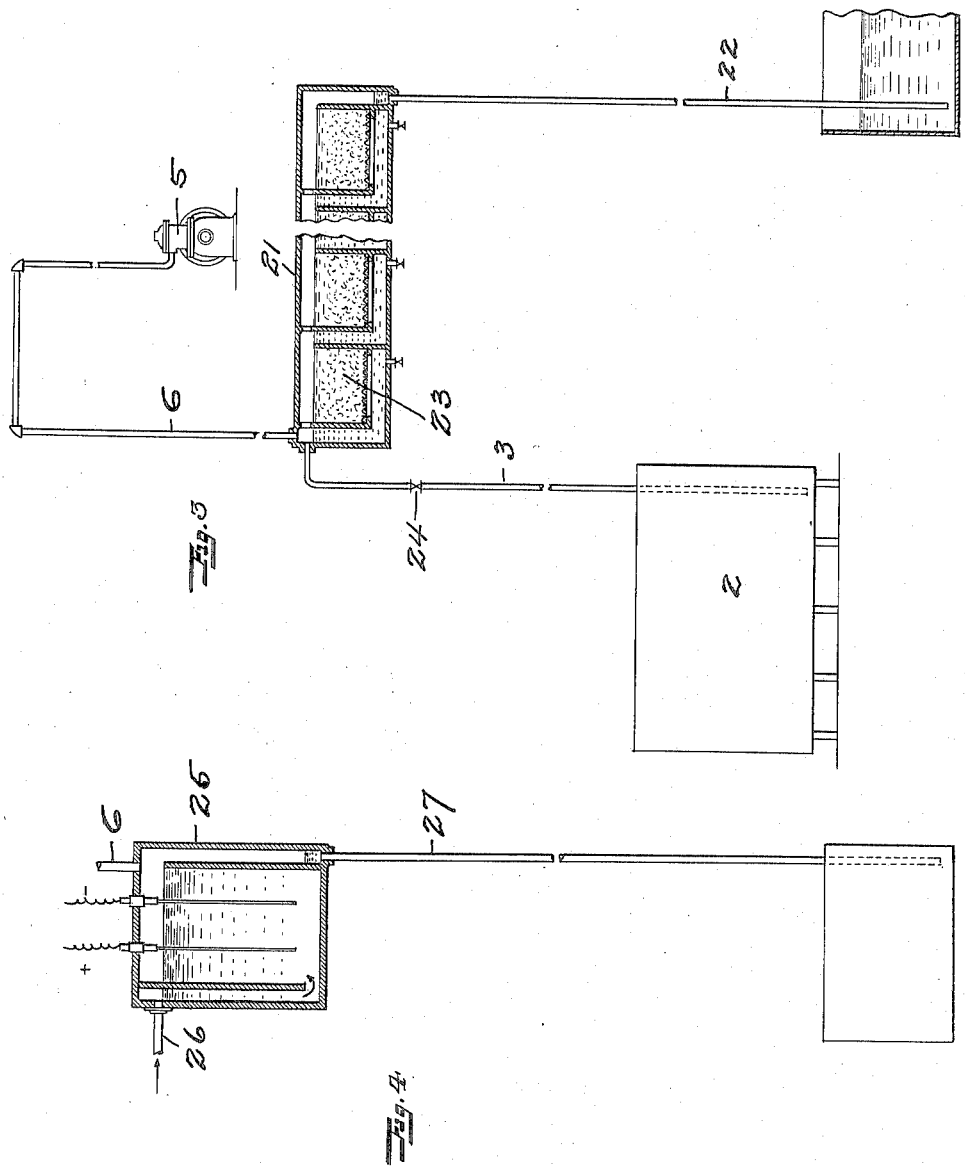
WITNESS.
J. B. Gardner
INVENTOR.
T. B. CROWE
BY White Prost.
HIS ATTORNEYS

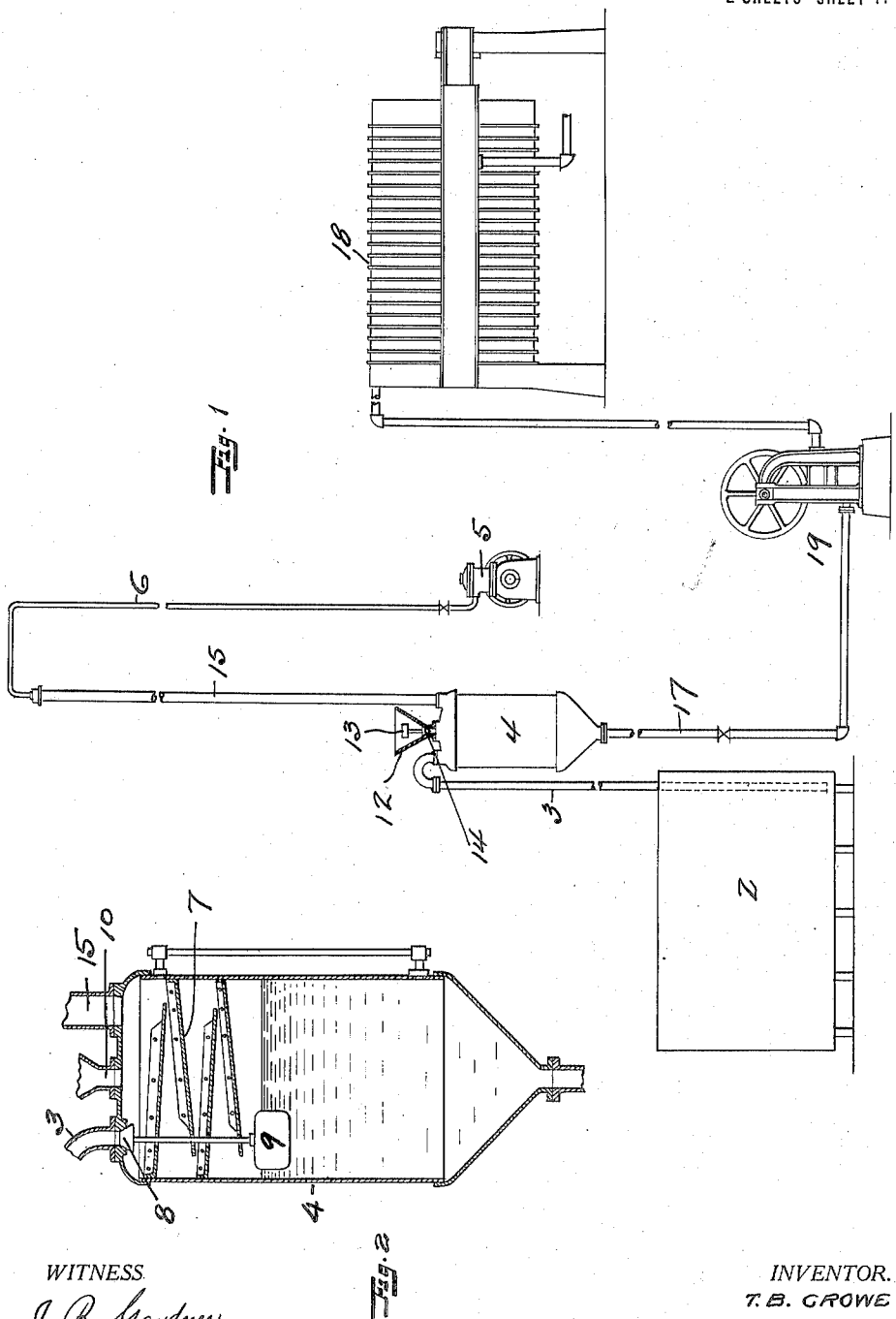

UNITED STATES PATENT OFFICE.

THOMAS B. CROWE, OF VICTOR, COLORADO, ASSIGNOR TO THE MERRILL COMPANY, OF SAN FRANCISCO, CALIFORNIA, A CORPORATION OF CALIFORNIA.

PROCESS AND APPARATUS FOR PRECIPITATING MATERIALS FROM SOLUTION.

1,321,985.   Specification of Letters Patent.   Patented Nov. 18, 1919.

Original application filed July 3, 1916, Serial No. 107,317. Divided and this application filed March 17, 1917. Serial No. 155,580.

*To all whom it may concern:*

Be it known that I, THOMAS B. CROWE, a citizen of the United States, and a resident of Victor, county of Teller, State of Colorado, have invented a new and useful Process and Apparatus for Precipitating Materials from Solution, of which the following is a specification.

This application is a division of my application Serial No. 107,317 filed in the Patent Office on July 3, 1916.

An object of the invention is to provide a process and apparatus for accomplishing the precipitation and recovery of materials from solutions, and particularly metals from hydro-metallurgical solutions, more efficiently and economically than heretofore.

Heretofore, the practice has been to add the precipitant to the solution as, for instance, zinc dust is added to cyanid solution, or to conduct the solution through a container in which the precipitate is held, such as conducting cyanid solution through a zinc box or conducting copper bearing solutions through a trough or tank containing iron, or to operate on the solution by an electric current. I have discovered that high efficiency and economy of precipitation by these and other methods have not been attained by reason of the failure to give proper attention to the presence of agents, particularly gases, which interfere with the action of the precipitant and my invention contemplates providing for better precipitation by diminishing the quantity or activity of such interfering agents. Thus, in the case of precipitation from cyanid solution by the zinc box or zinc dust methods commonly used, to which my invention is particularly applicable, the air, or oxidizing gases present during the action of the precipitant on the solution, interferes with the effectiveness of the action of the precipitant. In this instance I have found that the air or oxidizing gas is present in the solution itself in sufficient quantities to interfere with precipitation and my invention contemplates diminishing such interference by diminishing the quantity or interfering activity of such gas. In this specification, I use the expression gas to cover air and all other gases of a composition which interferes with the effectiveness of the precipitation.

The quantity or activity of such interfering gas may be diminished in many ways and I do not limit myself to any particular method of accomplishing it except where specifically so stated. It may be sufficiently accomplished by removal through subjecting the solution to the action of a vacuum, preferably accompanied by agitation, or in certain instances by chemical action, as, for instance, by adding a suitable reducing agent, such as sodium sulfid or the like, or by heating the solution. I speak of diminishing the quantity or activity of the interfering agent, because, while the complete prevention of the interference is desirable, absolute prevention is not always practicably attainable or necessary and my invention may be successfully applied by diminishing without completely preventing the interference.

The interfering gas may be dealt with prior to or during the precipitating action. I prefer ordinarily to diminish the quantity or activity of the interfering gas prior to or during the time at which the precipitant is added, so that the best conditions may be maintained throughout the whole of the precipitation process, but the benefits of the invention may be secured to a material extent in some instances by dealing with the interfering gas after the contact between solution and precipitant.

In this specification I describe the invention in connection with the cyanid process for recovery of gold, but it is to be understood that the invention is susceptible of general application. I have found that cyanid solution contains as an agent interfering with effective precipitation gas chiefly in the form of air, some of which is apparently physically held in the solution and some apparently dissolved in the solution. In accordance with my invention, the pregnant cyanid solution is treated to remove, partly or wholly, such gas simultaneously with the contact of a precipitant with the solution which is capable of precipitating the metal from the solution so that precipitation and the removal of the gas is practically simultaneous. The precipitant may, of course, be added to the solution or the solution conducted into contact with the precipitant, as, for example, in the well-known zinc dust and zinc box methods. Various forms of apparatus may be employed for practising my process, and in the drawings I have shown several forms in which the interfering gases are removed by subjecting the solution to the action of a vacuum, but it is to be understood that the process is in nowise limited to the use of the forms or apparatus shown.

Referring to the drawings:

Figure 1 is an elevation of one form of apparatus for carrying out the process of my invention, parts of the conductors being broken away to reduce the size of the figure.

Fig. 2 is a section through the vacuum chamber of an apparatus, showing baffle plates and a float valve arranged therein.

Fig. 3 is an elevation of another form of apparatus in which the solution is flowed through a trough or container in which the precipitant preferably in percolable condition is held.

Fig. 4 is an elevation of an electrolytic cell which may be substituted for the trough shown in Fig. 3, when the precipitation is to be accomplished by an electric current from an external source.

When gases in the solution are to be removed by a vacuum or reduction of pressure, the desired condition of vacuum may be obtained in several ways and in the accompanying drawings I have shown it as being produced in a tank or trough or cell through which the solution flows.

In the apparatus shown in Fig. 1, the pregnant solution with its entrained or dissolved gases flows from the storage or supply tank 2 through the pipe 3 into the closed tank 4, which is arranged above the supply tank a suitable distance, the length of the pipe 3 being such that the solution is drawn into the tank 4 when a condition of vacuum is produced in the tank 4. A vacuum pump 5 connected to the tank 4 by the pipe 6 exhausts the gas from the tank and causes the solution to flow into the tank, wherein the entrained or dissolved gas is released or withdrawn from the solution. The pipe 6 is provided with an enlarged portion 15 at its junction with the tank 4, which serves as a trap for receiving vapors and liquid particles carried in the gas stream. In order to facilitate the release of gas from the solution, baffle plates 7 may be arranged in the tank 4, over which the incoming solution flows in a thin stream. The tank 4 is provided with an inlet valve 8 which is controlled by a float 9 to interrupt the inflow of solution when the solution in the tank reaches a predetermined maximum level.

Means are provided for introducing the precipitant into the solution while it is subjected to the vacuum so that the removal of the gas which interferes with precipitation and the precipitation are practically simultaneous. Connected to the tank 4, preferably above the baffle plates, is a conductor 10 through which the precipitant, preferably in the form of an emulsion, is fed to the solution. The conductor 10 is provided with a hopper 12 in which is arranged a float 13 which controls the position of the valve 14 and thereby prevents the inflow of air to the tank, but allows the precipitant to be drawn into the tank by the reduction of pressure created therein.

The mixture of precipitate, precipitant and solution is drawn from the tank through the conductor 17 and is forced into the filter 18 by the pump 19, preferably of the triplex type, and the mixture is preferably conducted from the tank to the filter without pause or rest and or without contact with the atmosphere. In the filter the solids are separated from the liquid.

In Fig. 3 I have shown a modified form of apparatus for carrying out the process of my invention in which the pregnant solution is flowed through a trough or container 21, such as zinc boxes, in which the precipitant, preferably in the form of a percolable mass 23, is held, and through which the solution flows. The percolable or spongy mass is preferably composed of filiform precipitant, such as zinc sponge, zinc turnings, etc. The container or trough is closed to prevent the entrance of air or other interfering gas thereto, and is connected to a vacuum pump 5, so that the interfering gas is removed from the solution after it has entered the precitation trough. The flow of solution into the trough is controlled by a valve 24 in the pipe 3. From the precipitation trough or container the liquid discharges through the pipe 22 which extends downward a sufficient distance to seal the vacuum in the trough.

In Fig. 4 I have shown diagrammatically an electrolytic cell 25 through which the solution is flowed and in which the gases are removed from the solution. The solution is fed into the closed cell through the pipe 26 and discharges through the pipe 27 and the gases are withdrawn through the pipe 6, which is connected to the vacuum pump.

I claim:

1. The process of precipitating material from its solution, which consists in simultaneously removing from the solution gas which interferes with the precipitation and precipitating the material therefrom.

2. The process of precipitating material from its solution, which consists in simultaneously removing from the solution gas which interferes with the precipitation and precipitating the material therefrom while maintaining the solution out of contact with the atmosphere.

3. The process of precipitating and recovering material from its solution, which consists in simultaneously removing from the solution, gas which interferes with precipitation, and adding a precipitant to the solution and conducting the mixture without contact with the atmosphere to a filter.

4. The process of precipitating material from its solution, which consists in simultaneously subjecting the solution to a vacuum and precipitating the material therefrom.

5. The process of precipitating material from its solution, which consists in simultaneously subjecting the solution to a vacuum and precipitating the material therefrom by contact between the solution and a precipitant, and conducting the mixture without contact with the atmosphere to a filter.

6. The process of precipitating and recovering material from its solution, which consists in simultaneously removing from the solution, gas which interferes with precipitation, and adding a precipitant to the solution and conducting the mixture without rest to a filter.

7. The process of precipitating valuable metal from metal bearing cyanid solutions, which consists in subjecting the solution to the action of a vacuum for removing gases which interfere with precipitation, while the solution is in contact with a precipitant.

8. The process of precipitating valuable metal from metal bearing cyanid solution, which consists in removing from the solution gases which interfere with precipitation while the solution is in contact with a filiform metal capable of precipitating the valuable metal.

9. In an apparatus for precipitating material from its solution, a precipitant containing chamber receiving the solution and means for removing from the solution in said chamber, gas which interferes with precipitation.

10. In an apparatus for precipitating material from its solution, a closed precipitant containing chamber through which the solution is flowed, and means for creating a vacuum in said chamber.

11. In an apparatus for precipitating material from its solution, a conduit containing a precipitant in percolable form through which the solution is flowed and means for removing from the solution in the conduit, gas which interferes with precipitation.

12. In an apparatus for precipitating material from solution, a closed precipitant containing chamber through which the solution is flowed, means for removing from the solution in said chamber, gas which interferes with precipitation, a filter, and means for conducting the mixture of solution and precipitant, without contact with the atmosphere, to the filter.

13. In an apparatus for precipitating material from solution, a closed precipitant containing chamber through which the solution is flowed, means for removing from the solution in said chamber, gas which interferes with precipitation, a filter, and means for conducting the mixture of solution and preciptant, without rest, to said filter.

In testimony whereof, I have hereunto set my hand at Victor, Colorado, this 7th day of March, 1917.

THOMAS B. CROWE.